Sept. 19, 1967
R. M. PETERSON
3,342,060
INDEXING OF DIES
Filed Dec. 15, 1964
3 Sheets-Sheet 1
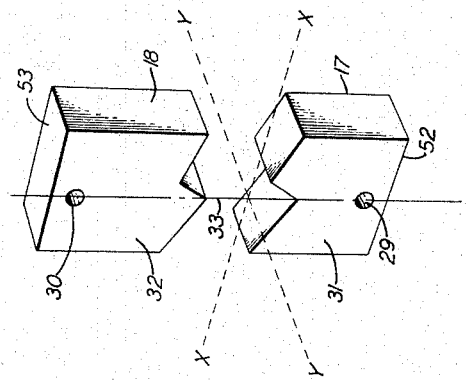
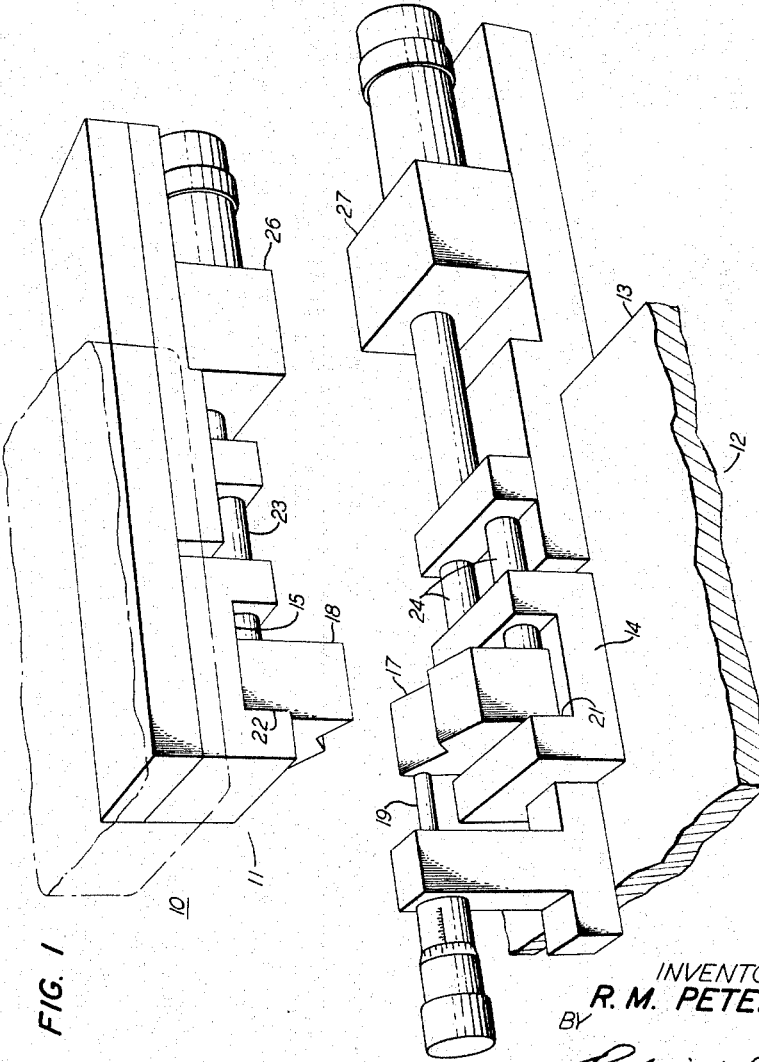
INVENTOR
R. M. PETERSON
BY
Roderick B. Anderson
ATTORNEY Sept. 19, 1967  R. M. PETERSON  3,342,060
INDEXING OF DIES Filed Dec. 15, 1964  3 Sheets-Sheet 2

Sept. 19, 1967

R. M. PETERSON 3,342,060

INDEXING OF DIES

Filed Dec. 15, 1964

United States Patent Office 3,342,060
Patented Sept. 19, 1967

3,342,060
INDEXING OF DIES
Roswald M. Peterson, 85 Weston Ave.,
Chatham, N.J. 07928
Filed Dec. 15, 1964, Ser. No. 418,442
3 Claims. (Cl. 72—470)

ABSTRACT OF THE DISCLOSURE

Expedient alignment of dies in a die press is accomplished by providing side walls in upper and lower die holders that lie in a common plane with aligned index pins extending from the side walls. Upper and lower dies are machined to have a flat side lying in a common plane. The dies are then compressed in a vise with a workpiece therebetween and index apertures are drilled in the flat sides of the dies using guide apertures of the vise for locating the index apertures. The dies are then mounted in the holders by extending the index pins into the index apertures.

---

This invention relates to methods and apparatus for aligning dies in die presses and similar machines.

Die presses are machines which mold workpieces to a desired configuration by compressing or stamping them between a pair of dies. A lower die is typically mounted on a base of the die press with an upper die being mounted on a vertically movable stamping ram. It is important that the dies be in near perfect alignment so that they will intermesh properly and thereby stamp workpieces into the desired configuration. Slight misalignments may cause premature wearing and deterioration of the dies and the die press even though satisfactory stampings may be produced.

Various adjustable die holders are presently used for adjusting the locations of the dies and mounting them firmly in place. The lower die is typically mounted in a rather complicated lower die holder, and is aligned by manually orienting the lower die in intermeshing relationship with the upper die. This procedure requires a relatively high degree of skill and care because the operator must depend on his own observation and judgment in adjusting the lower die holder. If the die press is used for "small lot" stampings, involving repeated changes of the dies that are used, the repeated alignment procedures may constitute an inordinately high proportion of the cost of manufacture.

Accordingly, it is one object of this invention to reduce the time and skill required for aligning dies in die presses and similar machines.

It is another object of this invention to reduce the cost and complexity of die holders and similar devices.

It is still another object of this invention to improve the accuracy of alignment of dies and similar devices.

These and other objects of the invention are attained in an illustrative embodiment thereof comprising a die press having upper and lower die holders with vertical support walls that lie on a common plane. Extending horizontally from the two support walls are two index pins which lie on a common center line. The upper and lower dies to be held by the die holders have flat side walls with index apertures of approximately the same diameter as the index pins. These dies are clamped against the vertical supporting walls of the die holders by vise rods. The side walls of the dies thereby abut firmly against the vertical supporting walls of the die holders with the index pins extending into the index apertures. This automatically orients both dies in predetermined longitudinal and transverse locations, as is required for simple and easy alignment in accordance with the invention.

As will become clear later, the arrangement described above requires dies having side walls that lie on a common plane and index apertures that lie on a common center line when they are in their proper predetermined alignment. Fabrication of the dies to have coplanar side walls is fairly simple in most cases because they can merely be clamped together in intermeshing relationship on the base of a milling machine. By then milling a common surface on the two dies, coplanar side walls are assured.

In accordance with the invention, a special vise is provided for aiding in the drilling of perfectly aligned index apertures in the dies. This vise comprises oppositely disposed lips which overlap the two jaws of the vise and extend toward each other. These lips contain apertures which are drilled on a common center line that extends precisely perpendicularly to the vise jaws. The two dies are then clamped into the vise with a workpiece between them, so that when the vise jaws are tightened the workpiece is deformed to the die configuration. The dies in this position are appropriately intermeshed and are therefore in their desired alignment. The index apertures are then drilled into the dies by extending a drill through the aligned apertures of the vise lips. It can be seen that this method of fabricating the dies assures that they will be appropriately aligned when they are clamped into the die holders of the die press. It can further be appreciated that insertion of the dies into the die press with highly accurate alignment can be accomplished with very little skill or time-consuming effort.

These and other objects and features of my invention will be more clearly understood from a consideration of the following detailed description taken in conjunction with the accompanying drawing in which:

FIG. 1 is a fragmentary perspective view of a die press employing the principles of my invention;

FIG. 2 is a perspective view illustrating the alignment of the dies of FIG. 1;

Figure 3:
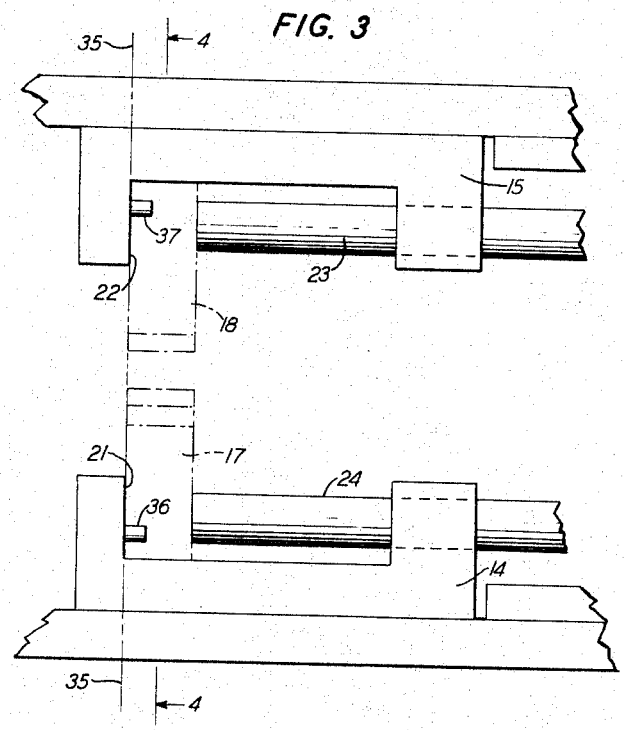
FIG. 3 is a front elevation view of part of the die press of FIG. 1.

Referring now to FIG. 1 there is shown a die press 10 comprising a ram 11 vertically displaced above a base 12. The base 12 comprises a bolster plate 13 upon which is mounted a lower die holder 14. The ram comprises an upper die holder 15. Removably mounted in the die holders are a lower die 17 and an upper die 18.

Die press 10 operates in a conventional manner to form stampings; that is, ram 11 is forcefully lowered to deform a flat workpiece located on the surface of lower die 17 into a configuration conforming with the intermeshed surfaces of the two dies. Since the present invention is concerned only with the alignment of the dies, the operation of the die press 10 will not be explained in detail. The construction and operation of bolster plate 13 and guide stops 19 are explained in my copending application Ser. No. 288,811, filed June 18, 1963.

The upper and lower die holders 14 and 15 comprise vertical support walls 21 and 22 respectively. Die 18 is clamped against support wall 22 by vise rods 23, while die 17 is clamped against support wall 21 by vise rods 24. These vise rods are preferably controlled by hydraulic vise presses 26 and 27 which may be actuated by electrical switches.

For die press 10 to operate properly, it is important that dies 17 and 18 be properly aligned so that when the ram 11 is forcefully lowered, die 18 will properly intermesh with die 17 to make the desired stamping. With reference to FIG. 2, proper alignment requires that die 18 be precisely positioned along the X axis and along the Y axis at a predetermined location with respect to die 17. The position of die 18 along the vertical axis will depend on the thickness of the workpiece to be stamped and it is determined by the vertical distance through which ram 11 is lowered. This adjustment is very easily made in a conventional manner.

In accordance with the invention, index apertures 29 and 30 are located in side walls 31 and 32 of the respective dies 17 and 18. The dies 17 and 18 are constructed such that their intermeshing surfaces will be in proper alignment when the flat side walls 31 and 32 lie on a common plane and when index apertures 29 and 30 lie on a common vertical center line. Preferred methods for constructing the dies in accordance with these conditions will be considered later.

Figure 4:
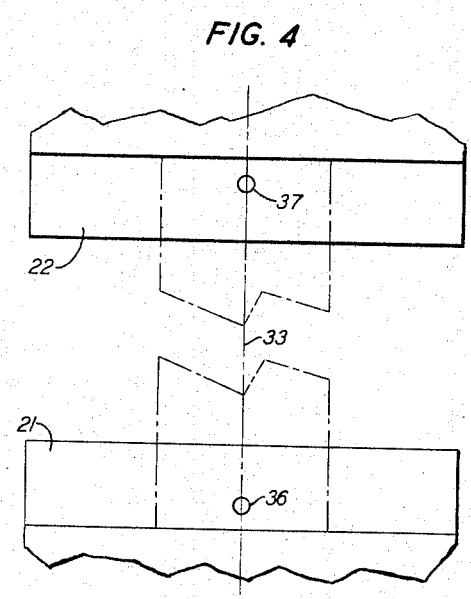
FIG. 4 is a section taken along lines 4—4 of FIG. 3.

Referring now to FIG. 3, it can be seen that the side walls 21 and 22 of the lower and upper die holders 14 and 15 lie along a common vertical plane 35. Extending horizontally from the support walls are index pins 36 and 37 which lie along a common vertical center line 33 as shown in FIG. 4. It is to be noted that the dies 17 and 18 are shown in phantom to aid in the illustration of index pins 36 and 37. The index pins are preferably circular and of approximately the same diameter as index apertures 29 and 30 of FIG. 2 so that they can readily be inserted therein with a minimum degree of play. Although circular index apertures and pins are the simplest to construct they may also assume other shapes; this may be adavntageous for giving a keying or locking action to provide further stability and exact positioning of the dies. With the dies 17 and 18 mounted as shown, the flat support walls 21 and 22 assure proper alignment in the Y direction because they are located on the common plane 35. Index pins 36 and 37 assure proper alignment in the X direction because they are located along the common center line 33. Hence, the conditions for alignment of the dies described above are fulfilled.

Turning next to the problem of manufacturing the dies, the reader is reminded that it is necessary that side walls 31 and 32 of FIG. 2 be coplanar and that apertures 29 and 30 lie along a common center line when the dies are in alignment. Forming the coplanar surfaces 31 and 32 is easily accomplished by intermeshing the two dies so that they will be in proper alignment and then mounting them on the base of a milling machine. The milling machine then simultaneously cuts the two surfaces 31 and 32 in a single operation, thereby assuring that they will be coplanar. The use of a milling machine in this manner will be readily apparent to any worker skilled in the art, and so an illustration thereof is not considered to be warranted.

Figure 5:
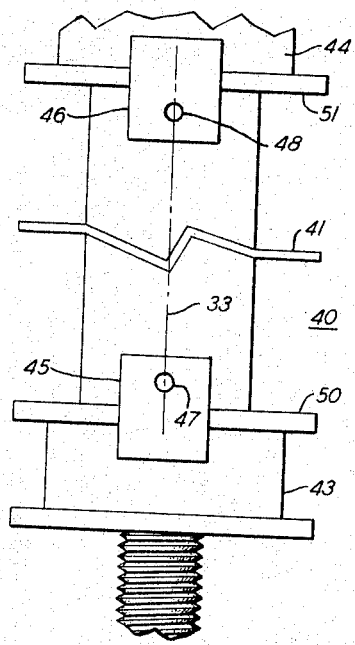
FIG. 5 is a top view of a vise arrangement for aiding in the drilling of index apertures in dies in accordance with my invention.

FIG. 5 shows a substantially conventional vise 40 which is modified in accordance with my invention to aid in the drilling of precisely aligned index apertures 29 and 30 in dies 17 and 18. The dies 17 and 18 are clamped by the vise in an intermeshing relationship preferably with a workpiece 41 between the die surfaces. As the dies are clamped together the workpiece 41 is deformed to conform to the die surfaces and constitutes a spacer which separates the dies by a distance equal to their separation when they are finally used to stamp out workpieces of the same thickness as workpiece 41.

Permanently bonded to the opposite jaws 43 and 44 of the vise are a pair of lips 45 and 46 of sheet metal or other appropriate material. Located in the two lips along a common center line 33 are guide apertures 47 and 48 of approximately the same diameter as apertures 29 and 30 of FIG. 2. These apertures constitute guides for the drilling bits of a drill press. The index apertures of the dies are formed by extending the drill of a drill press successively through the two guide apertures 47 and 48. Drilling the index apertures in the dies in this manner is quick, simple, and assures that they will be located along a common center line 33. This method presupposes that surfaces 50 and 51 of the vise are parallel, which is the case with conventional vises that can be easily modified to conform to FIG. 5. It also presupposes that the top and bottom surfaces 52 and 53 of the dies of FIG. 2 are flat and parallel. This is normally the case with dies made in a conventional manner from conventional die stock and therefore does not normally impose any additional conditions on the manufacture of the dies.

Figure 6:
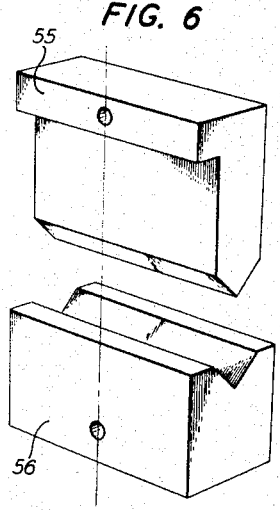
FIG. 6 is a perspective view of a pair of dies illustrating an alternative embodiment of my invention.
Figure 7:
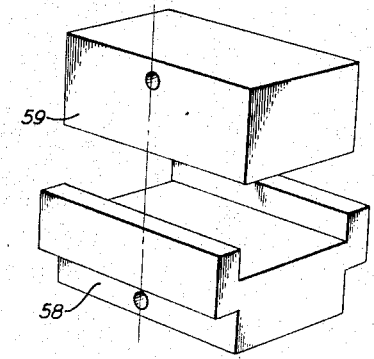
FIG. 7 is a perspective view of a pair of dies illustrating another embodiment of my invention.

In most cases, drilling index apertures in two dies which lie on a common plane and on a common vertical center line is very easy because the two dies are made of common die stock of the same thickness and the same rectangular cross section. In other cases, such as shown in FIGS. 6 and 7, the dies are modified to include coplanar side walls having index apertures located along the common center line. Referring to FIG. 6, the upper die has been modified to include a flange for defining a side wall 55 that is coplanar with a corresponding side wall 56. In FIG. 7, the lower die has been provided with an indented portion for defining a side wall 58 that is coplanar with the side wall 59 of the upper die. The modified side walls 58 and 55 of FIGS. 7 and 6 are preferably of the same height as support walls 21 and 22 of FIG. 3 for firm support of the dies in the die holders. With the dies slightly modified in this manner, index apertures which lie along a common center line can again be provided as described above.

From the above it is apparent that various other modifications and uses can be made of my indexing technique. For example, die stock which has been appropriately provided with an index aperture and a planar side wall can be mounted in a milling machine by a die holder such as the lower die holder 14 of FIG. 3. With the die holder appropriately oriented with respect to the cutter of the milling machine, this may greatly facilitate milling of the die surface. This may be particularly useful for milling symmetrical die surfaces such as the U-shaped die surface of the lower die of FIG. 7. My technique can also be used for piercing dies, extruding dies, multiple piercing and forming of dies, coining, stenciling, etc. Numerous other embodiments may be made by those skilled in the art without departing from the spirit and scope of the invention.

What is claimed is:

1. Apparatus for aligning dies in a die press comprising:
   means comprising a vise having first and second jaw surfaces for compressing in intermeshing relationship and for aligning first and second dies;
   means overlapping the first jaw defining a first guide aperture;
   means overlapping the second jaw defining a second guide aperture;
   said first and second guide apertures lying along a common center line, whereby aligned positions for drilling index apertures in the first and second dies are defined;
   the die press including an upper die holder having a first flat side wall extending from an upper wall surface and a lower die holder having a second flat wall extending from a lower wall surface;
   a first index pin extending from the first wall, the distance of the first pin from the upper wall surface being equal to the distance of the first guide aperture from the first jaw surface;
   a second index pin extending from the second wall, the distance of the second pin from the lower wall surface being equal to the distance of the second guide aperture from the second jaw surface;

means for clamping the first die against the first wall surface;

and means for clamping the second die against the second wall surface.

2. A method of aligning a pair of dies in a die press comprising the steps of:

providing a first flat wall surface on an upper die holder;

providing a second flat wall surface on a lower die holder which lies on a common plane with the first wall surface;

providing a first index pin on the first wall surface;

providing a second index pin on the second wall surface which lies on a common center line with the first index pin;

providing guide apertures which overlay the jaws of a vise and lie on a common center line;

clamping the two dies into the vise in intermeshing relationship with a workpiece therebetween;

drilling apertures in the two dies by extending a drill through each of the two guide apertures of the vise;

fitting the aperture of one of the dies onto the first index pin and clamping the die firmly against the first wall surface;

and fitting the aperture of the other die onto the second index pin and clamping the die firmly against the second flat wall surface.

3. The method of claim 2 further comprising the steps of:

mounting the two dies in intermeshing relationship on a cutting machine;

and simultaneously cutting flat surfaces on one side of the two dies, thereby assuring that the two cut surfaces will lie on a common plane when the dies are intermeshed.

References Cited

UNITED STATES PATENTS

| | | | |
|---|---|---|---|
| 2,186,799 | 1/1940 | Boker | 76—107 |
| 2,364,733 | 12/1944 | McCollum | 83—698 |
| 2,381,476 | 8/1945 | Wales | 29—465 |
| 2,382,267 | 8/1945 | Stellin | 83—698 |
| 2,387,027 | 10/1945 | Jackson | 83—698 |
| 2,769,990 | 11/1956 | Pawsat | 72—415 |
| 3,126,776 | 3/1964 | Whistler et al. | 76—107 |
| 3,260,098 | 7/1966 | Gill | 72—470 |

CHARLES W. LANHAM, *Primary Examiner.*

A. RUDERMAN, *Assistant Examiner.*